Dec. 17, 1957 J. D. CADDY 2,816,373
EDUCATIONAL DEMONSTRATOR
Filed June 7, 1954 2 Sheets-Sheet 1
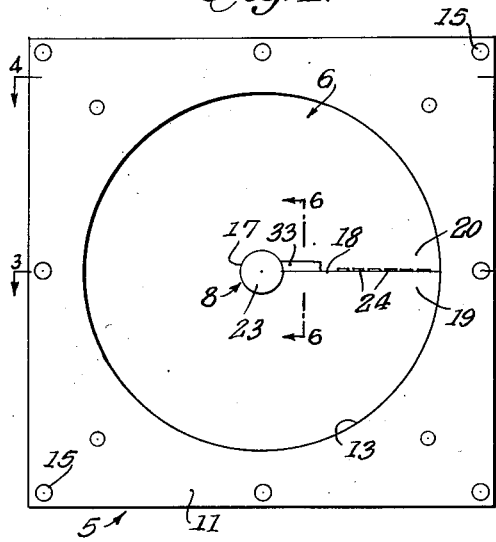
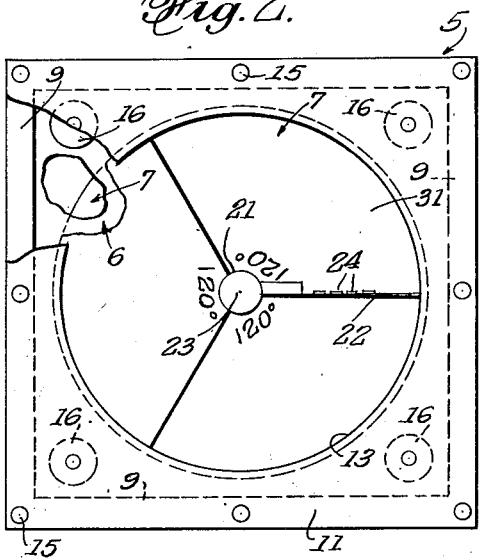
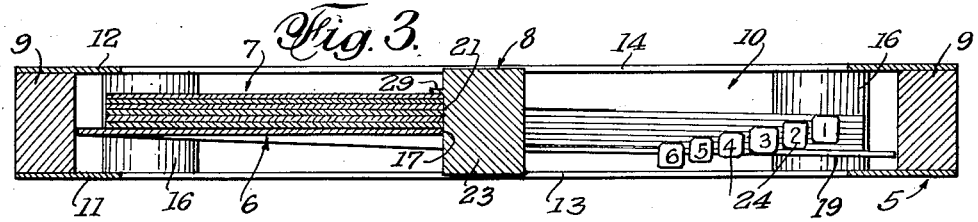
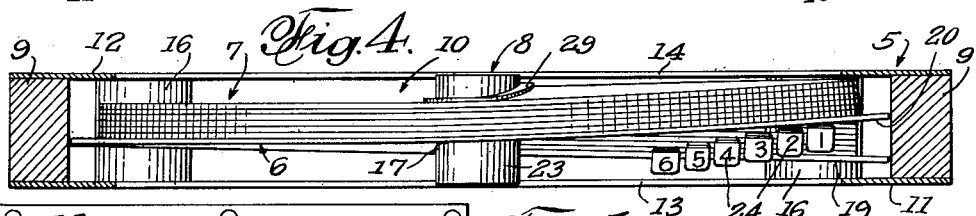
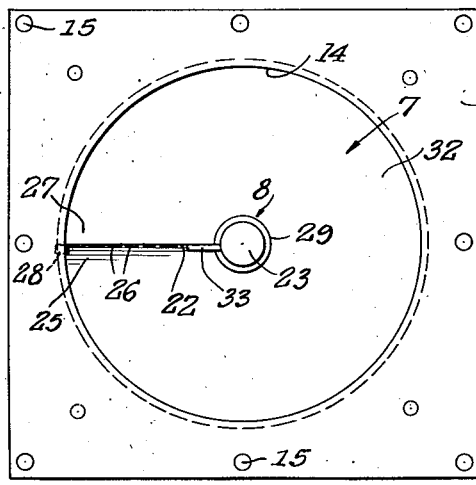
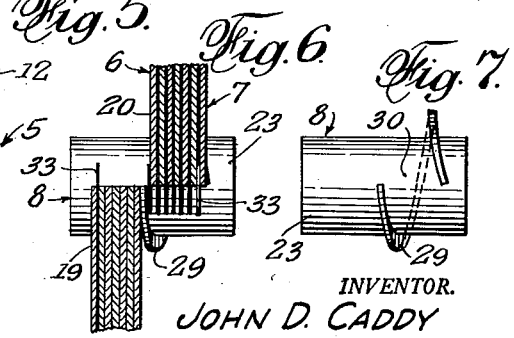
INVENTOR.
JOHN D. CADDY
BY
C. G. Stratton
ATTORNEY

United States Patent Office 2,816,373
Patented Dec. 17, 1957

2,816,373

EDUCATIONAL DEMONSTRATOR

John D. Caddy, Hollywood, Calif.

Application June 7, 1954, Serial No. 434,784

8 Claims. (Cl. 35—74)

This invention relates to an educational device of the type that is more particularly adapted to demonstrate arithmetical functions or subjects, such as fractions, segments of a circle, and the like, and other functions or subjects that are capable of being displayed or demonstrated visually.

An object of the present invention is to provide an educational device in which several generally flat sheets, each bearing different markings, graduations and/or indicia, are adapted to be selectively exposed to a viewing audience, such as a class of students.

Another object of the invention is to provide a device, as above indicated, in which the sheets are disposed in superimposed relation and, by rotation, a selected one of such sheets may be exposed to view, as desired.

A further object of the invention is to provide an educational device of the character above indicated which, while it has a normally front side, may have its sheets provided with markings, graduations and/or indicia on both sides and, thereby, be adapted for presentation to an audience with either side facing frontward.

Thes invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is a front elevational view of an educational device according to the present invention.

Fig. 2 is a similar view showing one of the sheets of said device exposed to view.

Figure 8:
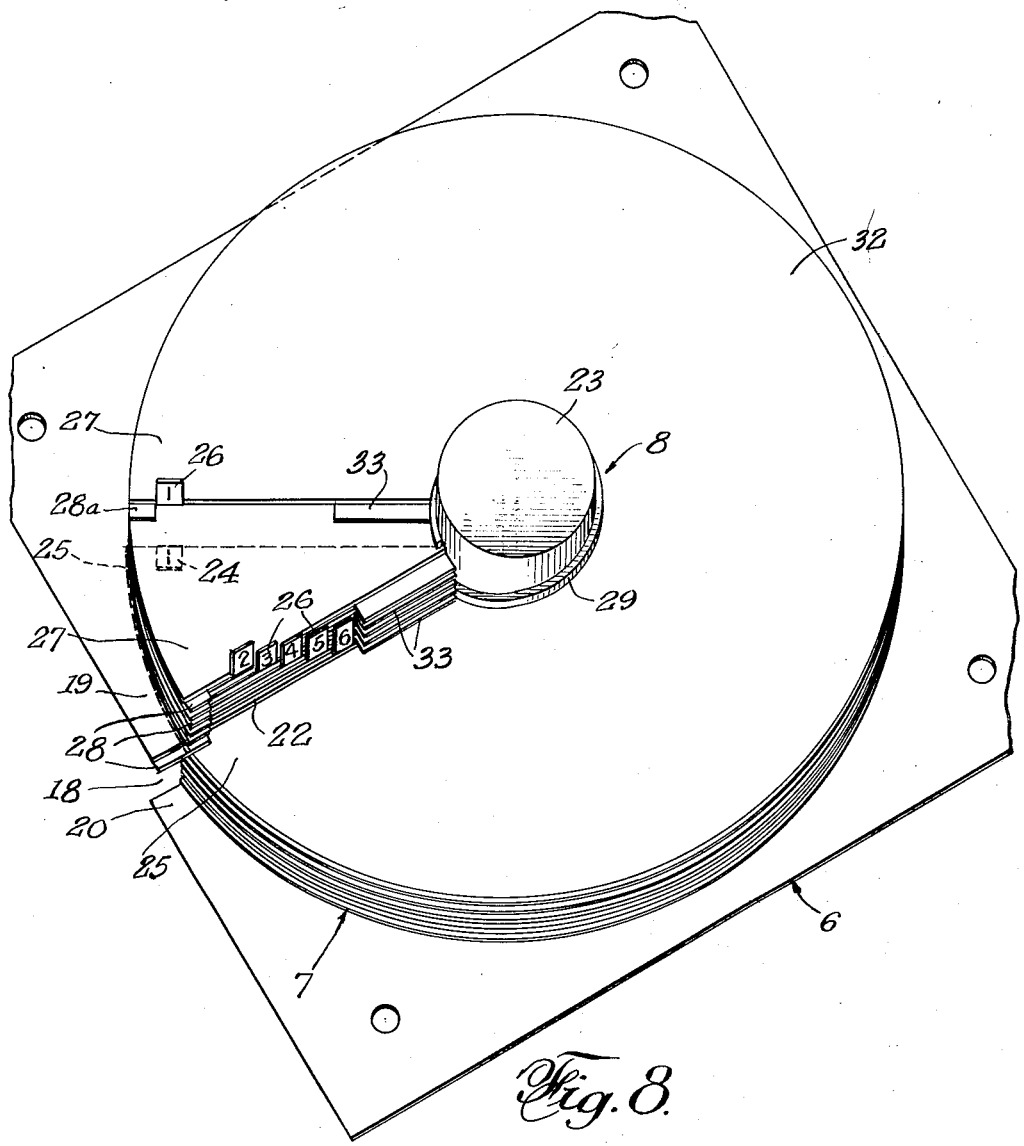

Figs. 3 and 4 are enlarged cross-sectional views as taken on the respective lines 3—3 and 4—4 of Fig. 1.

Fig. 5 is a rear elevational view of said device drawn to the scale of Figs. 1 and 2.

Fig. 6 is a further enlarged fragmentary cross-sectional view as taken on line 6—6 of Fig. 1.

Fig. 7 is an elevational view of an element employed in the device.

Fig. 8 is a perspective view, to the scale of Figs. 3 and 4, showing the device with its outer frame omitted; the same being shown as in Fig. 5 and with one of the demonstrator sheets moved with respect to the others.

The educational device that is illustrated comprises, generally, a frame 5, a master or masking sheet 6 non-rotationally disposed in said frame, a group or stack of subject sheets 7 in superimposed relation to the master sheet, and a core element 8 mounted centrally of the master sheet and serving as a center and transition piece for the subject sheets during movement thereof from a position behind said master sheet to demonstrating or viewing position.

The frame 5 is preferably square or rectangular, although the same may have other polygonal shapes. As shown, the same comprises side pieces 9 that enclose a space 10. The opposite side faces of said pieces are covered by facing sheets 11 and 12 in which aligned and preferably circular central openings 13 and 14 are respectively provided. Said facing sheets may be affixed to the frame pieces 9 as by tacks, rivets, staples 15, or other suitable means. The frame 5 further includes spacer elements 16 that are entered between facing sheets across space 10 and are preferably disposed in the angles or corners where the frame pieces 9 are joined to each other.

The master sheet 6 is disposed in space 10 and is preferably of the size and shape of said space. In this case, sheet 6 is square to fit within square space 10. Said sheet is held substantially centrally between facing sheets 11 and 12, preferably by connection of the corners thereof with elements 16. Said master sheet is provided with a central hole 17 and with a radial slit 18 that enables transverse offset of adjacent portions 19 and 20 of said sheet, as best seen in Figs. 4 and 6.

While sheet 6 is generally centrally located in space 10, the spacer elements 16 on each side of slit 18 hold portions 19 and 20 in offset relation, as shown best in Fig. 4. Said sheet is preferably made of a plastic material to have some rigidity and yet be suitably flexible.

The group or stack of sheets 7 comprises similarly flexible sheets that are preferably circular and somewhat larger than the openings 13 and 14 of the facing sheets 11 and 12. Each of said sheets 7 has a central hole 21 and a radial slit 22, said holes and slits being substantially similar to the hole and slit in master sheet 6.

The core element 8 is formed as a cylindrical member 23 of a diametral size to fit holes 17 and 21 and extends into and through said holes in the manner shown. Said core element is carried by sheet 6 and it in turn, and in combination with the master sheet 6, carries sheets 7. Consequently, the latter are capable of being rotated around said core element as a center.

The number of sheets 7 may vary with the number of functions or subjects to be displayed. Sheet 7 is provided with a designating tab 24 extending laterally outwardly from the split edge 22 of offset sheet portion 25 and with a second designating tab 26 extending laterally outwardly from offset sheet portion 27.

As can be seen from Figs. 3 and 4, said tabs 24 constitute stops that engage the edges of adjacent sheets and, thereby, align the slits 18 and 22 when the stack of sheets 7 is on one side of sheet 6. In the same manner, tabs 26 constitute stops that align the slits 18 and 22 when the stack of sheets 7 is on the opposite side of sheet 6.

It will be realized from the foregoing that sheet 6, by reason of its slit 18 and the offset portions 19 and 20, has the form of one convolution of a helix and that the sheets 7 are of similar helical form, either conforming to the form of sheet 6 or being held in such conformation by tabs 28 attached to sheet portions 27 and extending across slits 22, and into offsetting engagement with sheet portions 25. From Fig. 8 it will be seen that when all the slits 22 are aligned with each other and with the slit 18 in sheet 6, it is the tab 28, on the portion 19 of the latter sheet, that overstands the portion 25 of the outermost sheet 7 to retain the helical form of all of the sheets. It will be clear that the tabs 28 of each respective sheet 7, when a sheet is rotated through 360° to expose its markings for demonstration purposes, will retain such overlap across slits 22. If tab 28a (Fig. 8) is followed through a completed rotation of the uppermost sheet 7, the same will retain overlap with the portion 25 of the sheet immediately beneath. Hence, said outermost sheet can, without snagging, be returned to its initial position.

The core element 8 is provided with means in the form of a helix 29 that has at least one full convolution to provide a helical groove 30 in which the central portions of sheets 7 are confined.

From the position of Fig. 1, if one sheet 7 of the stack is to be moved into exposed position in front of masking sheet 6, one or the other of the tabs 24 or 26 of said sheets is used to rotate said sheet a full turn around core element 8. Inasmuch as the tabs 24 and 26 extend laterally outwardly, both tabs on said sheet are clear from interference with the other tabs or sheets as said sheet 7 is rotated in respect to said master sheet 6. In the same manner, a second sheet may be turned to place the same in front of the first sheet. This condition is shown in Fig. 2 and brings the markings, graduations and/or indicia in position to be viewed through the front opening 13 of frame facing 11. In like manner, all of the sheets 7 may be transposed from one side of masking sheet 6 to the other side and successively superimposed over the sheets 7 while being so transposed. Of course, two or more sheets 7 may be tranposed at the same time, if the same is desired.

Assuming that the faces of sheets 7 that are thus exposed are each marked, for instance, with radii dividing the different sheets into a different number of sectors, the characteristics of a circle and the number of degrees in the sectors thereof may be visually demonstrated.

In the same way that the face 31 of each of the sheets 7 may be exposed to view, the opposite face 32 of each such sheet may be similarly exposed, if viewed from the initially rear side of the device. Therefore, said faces 32 may bear thereon markings of a different character and relating to a subject different than circles and their sectors, for instance, fractions of circles.

The tabs 33 have a function similar to tabe 28 and may be provided where needed to guide the edges that define slots 22 that are adjacent to the core element 8 and, thereby, insure smooth and snagless operation of the device. The tabs 33 are attached to the split edges 22 of the sheets 7 in the same manner as the tabs 28.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. An educational device comprising a frame defining an interior space and having front and rear openings, a masking sheet having a radial slit and disposed within and retained nonrotationally in said space, the portions of said sheet adjacent the slit being oppositely deflected to impart to the sheet a one-convolution helical form, a core element carried by said sheet, and a plurality of similar subject sheets, rotatably carried by said core element, each said sheet also being radially slit and having portions adjacent the slit oppositely deflected, said subject sheets being transposable from one side to the other of the masking sheet by passing one deflected portion through the space defined by the oppositely deflected portions of the masking sheet while rotating said subject sheet a full turn around the core element.

2. An educational device comprising a frame defining an interior space and having front and rear openings, a masking sheet having a radial slit and disposed within and retained nonrotationally in said space, spacer means carried by the frame and engaged with the sheet to hold the same non-rotationally as mentioned, the portions of said sheet adjacent the slit being oppositely deflected to impart to the sheet a one-convolution helical form, a core element carried by said sheet, and a plurality of similar subject sheets, rotatably carried by said core element, each said sheet also being radially slit and having portions adjacent the slit oppositely deflected, said subject sheets being transposable from one side to the other of the masking sheet by passing one deflected portion through the space defined by the oppositely deflected portions of the masking sheet while rotating said subject sheet a full turn around the core element.

3. An educational device comprising a frame defining an interior space and having front and rear openings, a masking sheet having a radial slit and disposed within and retained non-rotationally in said space, spacer means carried by the frame and engaged with the sheet to hold the same non-rotatably as mentioned, the portions of said sheet adjacent the slit being oppositely deflected to impart to the sheet a one-convolution helical form, two of said spacer means being connected to said deflected portions of the sheet to retain deflection thereof, a core element carried by said sheet, and a plurality of similar subject sheets, rotatably carried by said core element, each said sheet also being radially slit and having portions adjacent the slit oppositely deflected, said subject sheets being transposable from one side to the other of the masking sheet by passing one deflected portion through the space defined by the oppositely deflected portions of the masking sheet while rotating said subject sheet a full turn around the core element.

4. An educational device according to claim 1: a full helical convolution on said core element, and the mentioned subject sheets being in the helical trackway defined by said helical convolution.

5. An educational device according to claim 1: a transversely directed tab on the radial edge of each helically deflected portion of each subject sheet, the tab of one edge being forwardly directed and that of the other edge being oppositely directed.

6. An educational device according to claim 1: a transversely directed tab on the radial edge of each helically deflected portion of each subject sheet, the tab of one edge being forwardly directed and that of the other edge being oppositely directed, and the tabs on the edges of the different subject sheets being arranged in series.

7. An educational device comprising a frame defining an interior space and having front and rear openings, a masking sheet having a radial slit therein disposed nonrotationally within said space, the portions of said sheet adjacent said slit being offset to impart to said sheet a one-convolution helical form, a core element carried by said sheet and having a helical trackway thereon, and a plurality of subject sheets in superimposed relation to said master sheet and carried by said core element, said subject sheets being rotatably mounted within the trackway of said core element and adapted to be transposed from one side of said masking sheet to the other side.

8. An educational device according to claim 7: said subject sheets having a radial slit to allow said sheets to take the helical form of said master sheet when superimposed thereon, and at least one tab attached to the slit edge of each of said sheets, said tab being directed laterally outwardly.

References Cited in the file of this patent

UNITED STATES PATENTS

| | | |
|---|---|---|
| 1,539,868 | Roberts | June 2, 1925 |
| 1,836,643 | Chesham | Dec. 15, 1931 |
| 2,011,517 | Geoffrion | Aug. 13, 1935 |

FOREIGN PATENTS

| | | |
|---|---|---|
| 15,279 | Great Britain | Oct. 24, 1888 |